United States Patent
O'Rourke et al.

(10) Patent No.: US 7,341,092 B2
(45) Date of Patent: Mar. 11, 2008

(54) WAY COVER IMPROVEMENTS

(75) Inventors: James D. O'Rourke, Pewaukee, WI (US); Cory L. Eckdahl, Waukesha, WI (US)

(73) Assignee: A & A Mfg. Co., Inc., New Berlin, WI (US)

( * ) Notice: Subject to any disclaimer, the term of this patent is extended or adjusted under 35 U.S.C. 154(b) by 0 days.

(21) Appl. No.: 10/553,042

(22) PCT Filed: Apr. 8, 2004

(86) PCT No.: PCT/US2004/010801

§ 371 (c)(1), (2), (4) Date: Oct. 13, 2005

(87) PCT Pub. No.: WO2004/096490

PCT Pub. Date: Nov. 11, 2004

(65) Prior Publication Data

US 2006/0225848 A1 Oct. 12, 2006

Related U.S. Application Data

(60) Provisional application No. 60/463,831, filed on Apr. 17, 2003.

(51) Int. Cl.
*E06B 9/00* (2006.01)

(52) U.S. Cl. ........................ 160/223; 160/11

(58) Field of Classification Search ............. 160/11, 160/222, 223, 224, 216, 202, 211; 52/67; 409/134; 384/15, 16
See application file for complete search history.

(56) References Cited

U.S. PATENT DOCUMENTS

| | | | | |
|---|---|---|---|---|
| 3,429,356 A | * | 2/1969 | Haschek et al. ............. | 160/223 |
| 3,570,578 A | * | 3/1971 | Loos ........................... | 160/202 |
| 3,603,373 A | * | 9/1971 | Loos et al. ................. | 160/202 |
| 3,603,651 A | * | 9/1971 | Weber ......................... | 384/16 |
| 3,845,591 A | | 11/1974 | Stine | |
| 3,964,801 A | * | 6/1976 | Steinmetz .................... | 384/16 |
| 4,447,929 A | * | 5/1984 | Hennig et al. ............. | 15/256.5 |
| 4,522,246 A | | 6/1985 | Bierbrauer et al. | |
| 4,771,816 A | * | 9/1988 | Clay, Jr. ..................... | 160/235 |
| 4,771,906 A | * | 9/1988 | Hennig et al. ............. | 220/8 |

(Continued)

FOREIGN PATENT DOCUMENTS

DE 7137781 U 11/1972

(Continued)

OTHER PUBLICATIONS

European Patent Office, Supplementary European Search Report, dated Jan. 17, 2007.

*Primary Examiner*—David Purol
(74) *Attorney, Agent, or Firm*—Quarles & Brady LLP

(57) ABSTRACT

A way cover section is shaped with a continuous lateral arc by pre-stressing so that its top panel has a radius in its top panel from one side panel of the cover section to the other. A wiper at the leading edge of the cover sections that may also serve as a bumper. The wiper has an elastomeric wiper section at one end and an elastomeric bumper section at the other end, with an intermediate section of a harder and more lubricious material that fits on a rolled over edge of the cover section to which the wiper is attached.

3 Claims, 3 Drawing Sheets

U.S. PATENT DOCUMENTS

| | | | | |
|---|---|---|---|---|
| 4,846,247 A | * | 7/1989 | Kessler | 160/235 |
| 4,860,917 A | * | 8/1989 | Stohr | 220/8 |
| 5,058,232 A | * | 10/1991 | Stohr | 15/236.01 |
| 5,092,079 A | * | 3/1992 | Brookman et al. | 49/496.1 |
| 5,156,195 A | * | 10/1992 | Wehler et al. | 160/202 |
| 5,169,223 A | * | 12/1992 | Suzuki et al. | 312/330.1 |
| 5,199,926 A | | 4/1993 | Hennig et al. | |
| 5,377,379 A | * | 1/1995 | Lo | 15/246 |
| 5,379,480 A | * | 1/1995 | Lo | 15/246 |
| 5,807,043 A | * | 9/1998 | Blank | 409/134 |
| 5,863,163 A | * | 1/1999 | Wehler et al. | 409/134 |
| 5,915,897 A | * | 6/1999 | Reynolds | 409/134 |
| 6,052,859 A | * | 4/2000 | Diels | 15/256.5 |
| 6,446,391 B1 | | 9/2002 | Timothy | |
| 6,446,397 B1 | * | 9/2002 | O'Connor et al. | 52/64 |

FOREIGN PATENT DOCUMENTS

DE 9408621 U1 8/1994

* cited by examiner

WAY COVER IMPROVEMENTS

CROSS-REFERENCE TO RELATED APPLICATION

This claims the benefit of U.S. Provisional Patent Application Ser. No. 60/463,831 filed Apr. 17, 2003.

STATEMENT CONCERNING FEDERALLY SPONSORED RESEARCH OR DEVELOPMENT

Not applicable.

FIELD OF THE INVENTION

This invention relates to telescoping way covers, and in particular to a structure and method for forming the way cover sections to regularize their shape and increase their strength, and to a new bumper which absorbs the impact between adjacent cover sections upon extension and retraction of the cover.

BACKGROUND OF THE INVENTION

Telescoping covers, such as the telescoping machine tool way covers shown in U.S. Pat. No. 6,446,391 B1, the disclosure of which is hereby incorporated by reference, are typically made up of a number of sheet metal sections which are telescoped together. The sections have end walls or flanges that catch on one another so that when one end of the cover is pulled to extend or pushed to retract the cover, the cover extends or retracts and remains covering the way as it is moving by the end walls or flanges of each section abutting end walls or flanges of the next adjacent section until the cover is totally extended or retracted.

Way covers are typically flat, or made of two flat panels which are tented in the center. In either event, the walls of adjacent sections are relatively close to each other such that even minor imperfections in the shapes, such as small dents or bends, can result in rubbing of one section wall on the next adjacent section wall which creates friction, noise and scratching of the section surfaces. It also creates assembly problems when initially assembling the cover, as nearly all imperfections need to be taken out manually (e.g., with a hammer) so that at least initially the cover sections do not contact one another. However, in use, heavy tools are dropped on the way cover or someone may step on it, which can bend the section sufficiently so that adjacent sections rub.

In addition, bumpers have normally been used to dampen the impact as the end walls or flanges of adjacent cover sections bump up against one another when extending or retracting the cover. These bumpers have typically been elastomeric pads placed in between the abutting walls of the adjacent way cover sections, typically at the trailing ends of the cover sections. For example, in many prior art designs, replacement of the bumpers required substantial disassembly of the way cover. In addition, the bumpers gained some of their strength from the sheet metal of the cover themselves, and so the sheet metal had to be made relatively thick to support the bumper. In addition, as the bumpers were made of elastic materials, if the bumpers would rub between adjacent sections, excessive friction forces could result from the elastomer rubbing on the adjacent section.

Prior art way covers have also included wipers, typically elastomeric and installed at the leading ends of the cover sections. The purpose of the wipers is to prevent cut metal chips, oil and other debris from building up between the cover sections. They work like a windshield wiper or window squegee to clear the top surface of the cover section below the cover section to which the wiper is mounted. These also can rub between adjacent cover sections so as to create excessive friction forces, and can be difficult to install, remove and replace.

SUMMARY OF THE INVENTION

In one aspect of the invention, the invention provides a cover section that is shaped with a continuous arc from side to side so that its top panel is not flat but has a radius in its top panel from one side panel of the cover section to the other. Forming the cover section into this shape regularizes the shape so as to take out any initial imperfections in the flatness of the sheet which forms the cover section, and also reinforces the ability of the cover section to support the loads, for example if someone steps on it or drops a heavy tool on it.

Preferably, the cover section is arched by pre-stressing it into that shape when making the cover section. A preferred method of pre-stressing the cover section is to secure it at one end in the arched shaped against a flange of the cover section.

In another aspect of the invention, a wiper is provided at the leading edge of the cover sections, which may also serve as a bumper. Preferably, the wiper has an elastomeric wiper section that wipes on the next section down at one end of the wiper to prevent excessive chips, oil and other debris from getting between the cover sections, and at the other end of the wiper has an elastomeric bumper section.

Preferably, between the two elastomeric sections, there is provided an intermediate section that is made of a harder and more lubricious material that can rub on the surface of the next section down with relatively less friction, if need be.

In another aspect, the wiper is preferably shaped to be fitted onto a rolled over edge of the cover section to which it is attached. The rolling over of the edge strengthens the cover section against bending, which enables using lighter gauge sheet metal to make the section, with correspondingly reduces the weight of the cover sections and the inertia forces which must be absorbed by the bumper when extending and retracting the cover.

These and other features and advantages of the invention will be apparent from the following detailed description and drawings.

DETAILED DESCRIPTION OF THE PREFERRED EMBODIMENT

Figure 1:
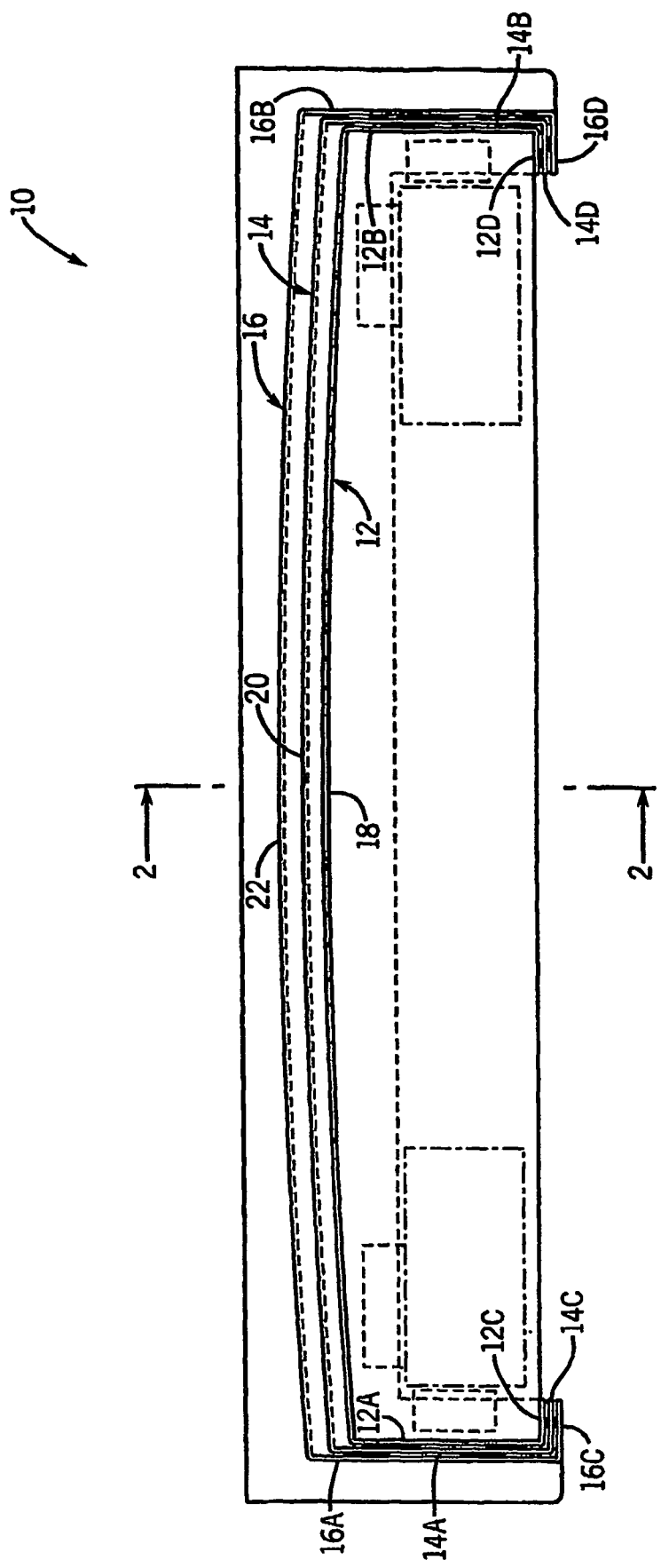
FIG. 1 is an end view (taken in a lateral plane) of three cover sections telescopically arranged with respect to each other.
Figure 2:
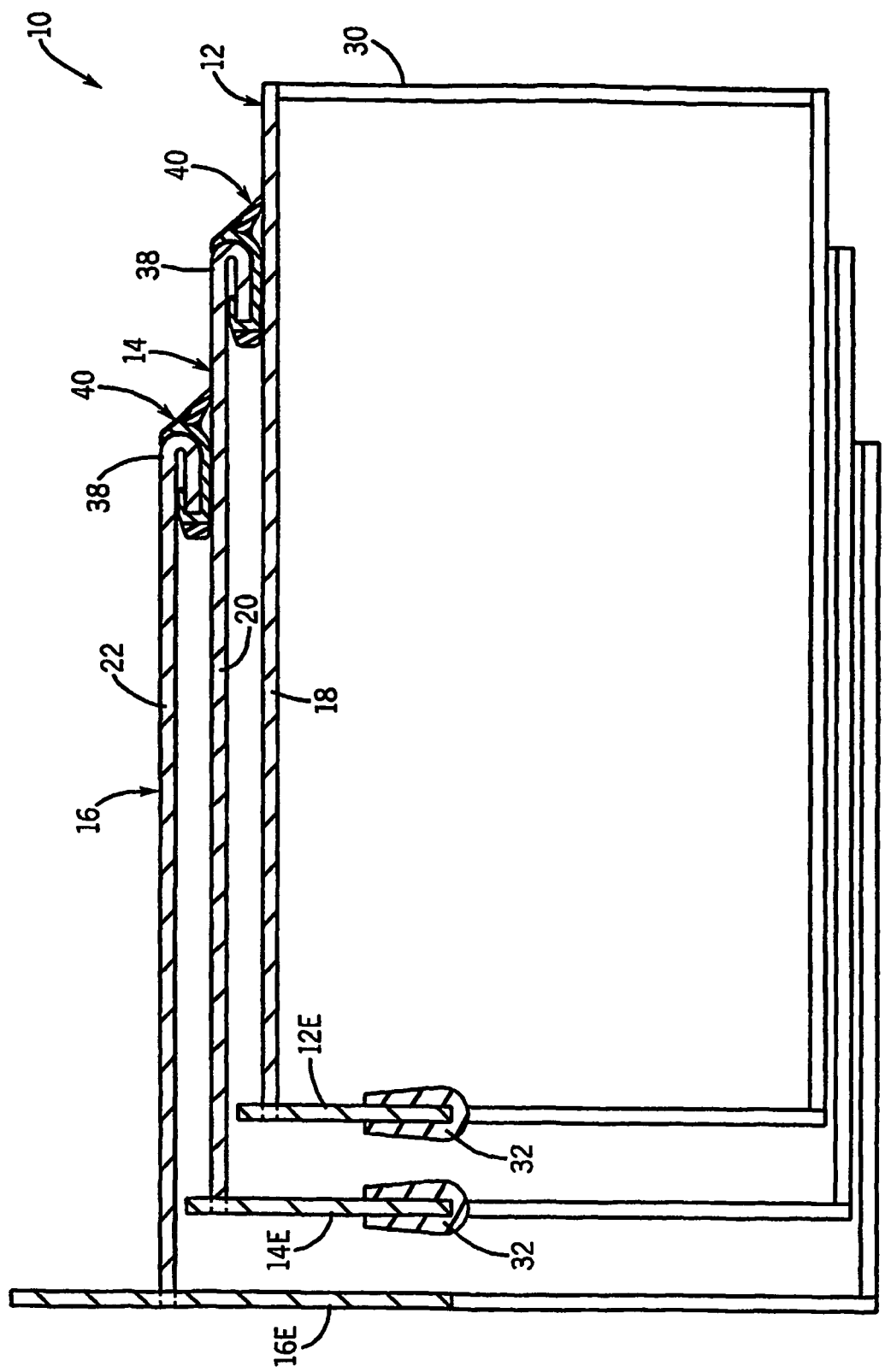
FIG. 2 is a cross sectional view from the plane of the line 2-2 of FIG. 1.
Figure 3:
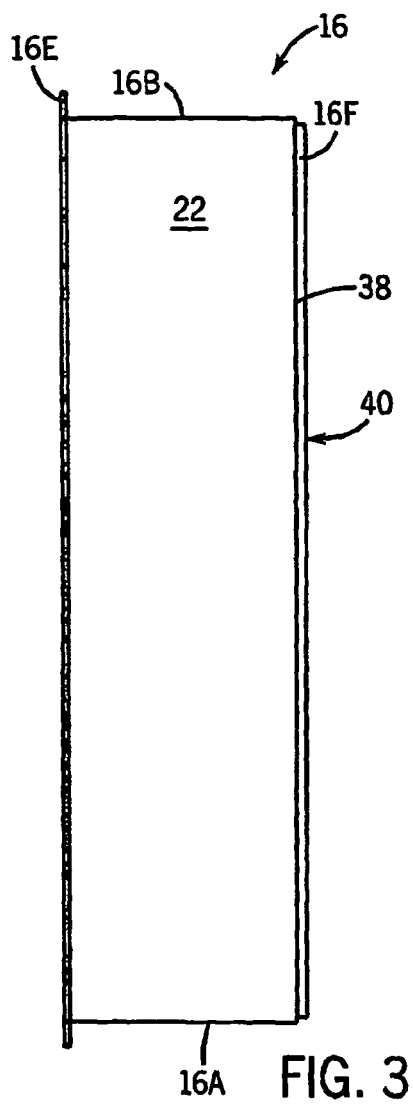
FIG. 3 is a top plan view of one cover section.

FIGS. 1-3 of U.S. Pat. No. 6,446,397 B1 illustrate a prior art construction of a way cover in which the cover sections are tented with a peak in the middle and FIGS. 4-7 illustrate cover sections which are flat topped. The present invention differs from either of the prior art configurations illustrated in U.S. Pat. No. 6,446,397 B1, as shown in FIG. 1, by the sections being arched with a continuous arc laterally, i.e. in the direction from side to side. Thus, it can be seen in FIG. 1, that each section 12, 14, 16 has a respective top wall 18, 20 or 22 which, when viewed in a lateral plane, is shaped to have a continuous radius from side to side, i.e. from side wall 12A to 12B in the case of the cover section 12, from side wall 14A and 14B in the case of cover section 14 and from side wall 16A to 16B in the case of cover section 16. Each cover section 12, 14 and 16 also has respective inwardly turned bottom flanges at the bottom of the side walls 12C and 12D, 14C and 14D, and 16C and 16D, respectively.

Referring particularly to FIG. 2, each cover section also includes a respective flange 12E, 14E or 16E. Cover section 12, which is an end section, may also be provided with an end wall or flange 30 which closes the end opposite from the flange 12E, or at lease partially closes it. Bumpers 32, made of an elastomeric material, may also be provided on the flanges 12E and 14E to absorb impacts as the cover is retracted. It should be noted that the cover 10 may be formed of any number of cover sections, only three being illustrated in FIGS. 1 and 2.

Figure 4:
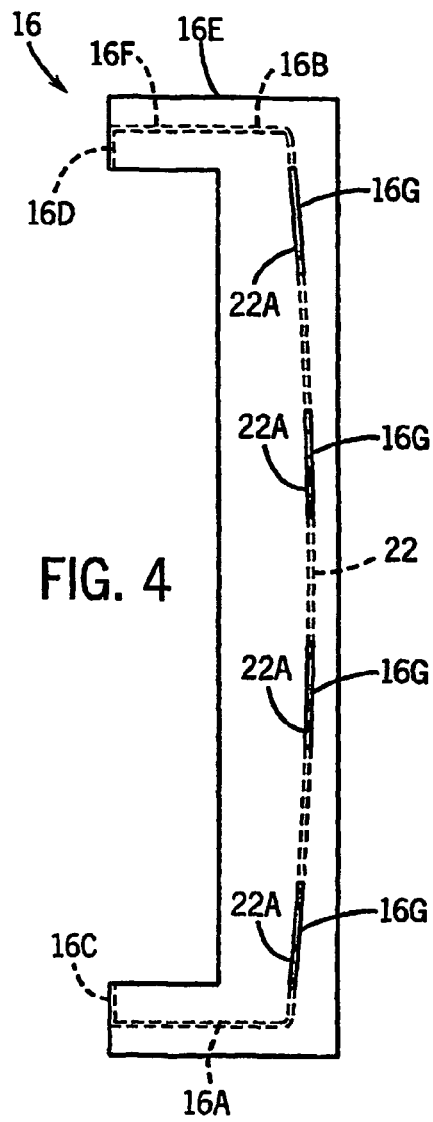
FIG. 4 is a front plan view of a flange of the cover section in FIG. 3.

Referring to FIGS. 3 and 4, which illustrate cover section 16 only, with the body section 16F shown in phantom behind the flange 16E, it is seen that the arc is formed in the top wall 22 of the body section 16F by forming slots 16G an arcuate pattern in the flange 16E. Corresponding tabs 22A, which extend from the rear edge of the body section 16F for approximately the thickness of the flange 16E, fit into the slots 16G so as to form the arch or radius in the top wall 22. The body section 16F is welded or otherwise affixed to the flange 16E at suitable positions along the junction between the body section 16F and the flange 16E at suitably spaced positions.

The body 16F may be welded to the flange 16E at positions along the bottom side flanges 16C and 16D, along the junction between the side walls 16A and 16B, and at the junctions with the top wall 22. This helps impart a continuous lateral (side to side) arch in the top wall 22, which extends for the length of the top wall 22, from the flange 16E to the opposite edge 38 at which the wiper 40 is positioned.

Figure 5:
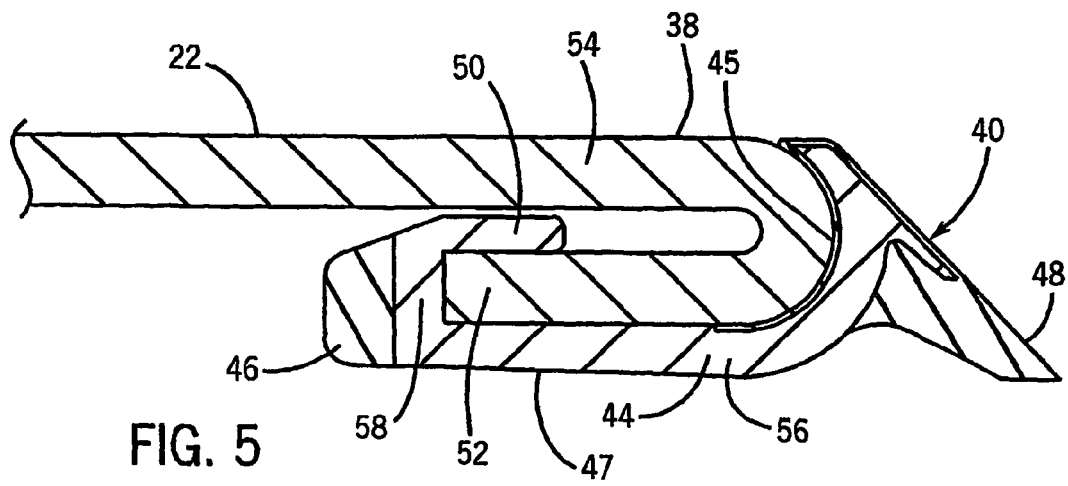
FIG. 5 is a detail view of a wiper mounted on a leading edge of one of the cover sections.

As illustrated in FIGS. 2 and 5, the edge 38 to which the wiper 40 is assembled is formed inwardly, or hemmed, at 180 degrees to the main portion of the top wall 22. This helps to reinforce the edge 38 and helps it to resist vertically downward loads. As mentioned above, the arching of the top wall 22 from side to side, i.e. so that it is arched in a lateral plane, with the axis about which it is arched generally parallel to the direction of extension and retraction of the cover and below the cover, also helps reinforce the entire top wall and helps it resist vertically downward forces.

Only section 16 is illustrated in FIGS. 3 and 4. Sections 18 and 20 are substantially the same, except as otherwise described or illustrated.

Referring to FIGS. 3 and 5, the wiper 40 extends for substantially the entire width (laterally from side to side) of the edge 38 so that the wiper 40 extends laterally across each cover section to which the wiper 40 is assembled. The wiper 40 is a composite of a harder more lubricious middle section 44 and softer elastomeric end sections 46 and 48 which are strongly adhered, or molded in one piece with, the middle section 44 in a co-extrusion co-molding process.

Referring to FIG. 5, the harder, more lubricious middle section 44 gives strength to the wiper 40 to hold onto the rolled over edge 38 with a form fit, preferably a snap fit, the middle section 44 having a lip 50 which fits between the inner side 52 of the edge 38 and the outer side 54 of the edge 38. By form fit it is meant that the shapes of the edge 38 and wiper 40 interfit with one another to hold the wiper 40 onto the edge 38 in normal operation of the cover 10. The lip 50 is joined to the inner side 56 of the mid-section 44 by inner end wall 58 to which is attached bumper 46, which is made out of the softer, elastomeric material. The leading or front edge of mid-section 44 is curved to follow the radius of the inner edge 38 and that portion of the mid-section 44 is over-molded with a thin layer 45 of elastomeric material which continues into the end section 48 that forms a wiper, that wipes chips, oil and other debris from the top of the cover section which is below the wiper 40.

The middle section 44 is sufficiently flexible so that end 50 can be hooked over the inner end of wall 52 and the wiper 40 snapped over the rounded front edge of the edge 38 that joins the inner wall 52 to the outer wall 54 of the edge 38, so that the snap fit of the wiper 40 onto the edge 38 holds the wiper 40 onto the edge 38. Also, this enables the wiper 40 to be easily assembled and disassembled from the edge 38 without removing the cover sections individually from the entire cover 10.

Since the mid section 44 is exposed to the next cover down from the cover to which the wiper 40 is assembled, if the seal 40 rubs on that cover, it will rub with a lubricious and hard, long wearing surface 47.

A preferred embodiment of the invention has been described in considerable detail. Many modifications and variations to the embodiment described will be apparent to those skilled in the art. Therefore, the invention should not be limited to the embodiments described, but should be defined by the claims that follow.

The invention claimed is:

1. In a telescopic way cover of the type that has cover sections telescopically arranged with one another, each section having a top wall and side walls and at least some sections fitting at least partially below other sections, the improvement wherein the top wall of at least some of the sections is arched so that it forms a continuous curve in a lateral plane that extends between sides of the section and wherein the cover section includes a wiper at a leading edge thereof, the leading edge of the cover being rolled over so as to define an inner wall with a rearwardly facing surface at a rear edge of the inner wall and a forwardly facing surface at a front edge of the cover, and wherein the wiper abuts the rearwardly facing surface and the forwardly facing surface so as to restrain the wiper forwardly and rearwardly relative to the cover.

2. In a telescopic way cover of the type that has cover sections telescopically arranged with one another, each section having a top wall and side walls and at least some sections fitting at least partially below other sections, the improvement wherein the top wall of at least some of the sections is arched so that it forms a continuous curve in a lateral plane that extends between sides of the section and wherein the top wall has tabs which fit into slots in a flange of the cover section and the slots are arranged in a continuous arc pattern.

3. In a telescoping way cover of the type that has cover sections telescopically arranged with one another, at least some of the sections having a front edge and a wiper on the front edge which wipes on the cover section below the cover section with the wiper, the improvement wherein the front edge is rolled over and mounts a wiper with a form fit between the wiper and the rolled over edge, wherein the wiper is snap fit to the front edge;
wherein the wiper is co-extruded of two materials of different hardnesses; and
wherein the wiper includes a middle section of a relatively harder material than a wiper at a leading end of the wiper, the middle section being positioned between the front edge of the cover to which the wiper is attached and the next cover section down.

* * * * *